(12) United States Patent
Lousenberg et al.

(10) Patent No.: US 11,905,350 B2
(45) Date of Patent: Feb. 20, 2024

(54) GAS PERMEABLE FLUOROPOLYMERS AND IONOMERS

(71) Applicant: Compact Membrane Systems, Inc., Newport, DE (US)

(72) Inventors: Robert Daniel Lousenberg, Wilmington, DE (US); Andrew Edward Feiring, Wilmington, DE (US)

(73) Assignee: Compact Membrane Systems, Inc., Newport, DE (US)

( * ) Notice: Subject to any disclaimer, the term of this patent is extended or adjusted under 35 U.S.C. 154(b) by 0 days.

(21) Appl. No.: 17/640,231

(22) PCT Filed: Sep. 9, 2020

(86) PCT No.: PCT/US2020/049917
§ 371 (c)(1),
(2) Date: Mar. 3, 2022

(87) PCT Pub. No.: WO2021/050529
PCT Pub. Date: Mar. 18, 2021

(65) Prior Publication Data
US 2022/0315681 A1 Oct. 6, 2022

Related U.S. Application Data

(60) Provisional application No. 62/897,931, filed on Sep. 9, 2019.

(51) Int. Cl.
*C08F 216/14* (2006.01)
*B01D 71/44* (2006.01)
*H01M 8/1004* (2016.01)

(52) U.S. Cl.
CPC ........ *C08F 216/1408* (2013.01); *B01D 71/44* (2013.01); *H01M 8/1004* (2013.01)

(58) Field of Classification Search
CPC . C08F 216/1408; B01D 71/44; H01M 8/1004
USPC ....................................................... 526/247
See application file for complete search history.

(56) References Cited

U.S. PATENT DOCUMENTS

| | | | |
|---|---|---|---|
| 4,273,728 A | 6/1981 | Krespan | |
| 4,273,729 A | 6/1981 | Krespan | |
| 4,275,225 A | 6/1981 | Krespan | |
| 4,474,700 A | 10/1984 | Krespan | |
| 4,597,913 A | 7/1986 | Kimoto et al. | |
| 4,948,844 A | 8/1990 | Nakahara et al. | |
| 5,830,962 A | 11/1998 | Feiring et al. | |
| 7,112,314 B2 | 9/2006 | Brothers et al. | |
| 7,220,508 B2 | 5/2007 | Watakabe et al. | |
| 9,120,834 B2* | 9/2015 | Campos | C07F 9/5407 |
| 10,029,248 B2* | 7/2018 | Feiring | B01D 71/76 |
| 10,639,591 B1 | 5/2020 | Lousenberg et al. | |
| 2001/0025819 A1* | 10/2001 | Bowser | B01D 61/364 |
| | | | 210/640 |
| 2003/0104150 A1* | 6/2003 | Bonnet | C08L 27/16 |
| | | | 252/511 |
| 2012/0097612 A1* | 4/2012 | Nemser | B01D 71/32 |
| | | | 210/500.27 |
| 2013/0245219 A1 | 9/2013 | Perry et al. | |
| 2013/0253157 A1 | 9/2013 | Takami et al. | |
| 2014/0128560 A1* | 5/2014 | Roelofs | H01M 8/1023 |
| | | | 526/243 |
| 2015/0025293 A1* | 1/2015 | Feiring | B01D 71/82 |
| | | | 585/818 |
| 2015/0119577 A1* | 4/2015 | Campos | C07C 209/86 |
| | | | 548/335.1 |
| 2018/0111099 A1* | 4/2018 | Shangguan | C08F 216/1408 |

FOREIGN PATENT DOCUMENTS

| | | |
|---|---|---|
| JP | 2002348389 A | 12/2002 |
| JP | 2004051685 A | 2/2004 |
| WO | WO 2016-182889 A1 | 11/2016 |
| WO | WO-2016182889 A1 * | 11/2016 ........... B01D 53/228 |

OTHER PUBLICATIONS

Feiring et al. "Synthesis of partially fluorinated monomers and polymers for jon-exchange resins", Journal of Fluorine Chemistry. vol. 93, No. 2, 1999, pp. 93-101. (Year: 1999).*

Feiring et al. "Synthesis of partially fluorinated monomers and polymers for ion-exchange resins", Journal of Fluorine Chemistry,. vol. 93, No. 2, 1999, pp. 93-101. (Year: 1999).*

International Search Report for PCT/US2020/049917.

Feiring A. E. et al., "Synthesis of partially fluorinated monomers and polymers for ion-exchange resins," Journal of Fluorine Chemistry, Elsevier, NL, vol. 93, No. 2, Feb. 4, 1999, pp. 93-101.

\* cited by examiner

*Primary Examiner* — Michael M. Bernshteyn
(74) *Attorney, Agent, or Firm* — Seed IP Law Group LLP

(57) ABSTRACT

Novel copolymers that are fluoropolymers including a first repeat unit that is fluorinated and cyclic and a second repeat unit from a trifluorovinyl methylene ether monomer having sulfur or sulfone functionality in the pendant group are disclosed. The copolymers have relatively high gas permeability as a result of a cyclic repeat unit in the copolymer backbone and ionomers from oxidation of the sulfur containing functionality are particularity useful in the cathode structure of a proton exchange membrane fuel cell.

7 Claims, No Drawings

GAS PERMEABLE FLUOROPOLYMERS AND IONOMERS

CROSS REFERENCE TO RELATED APPLICATIONS

This application claims the benefit of priority to U.S. Provisional Patent Application No. 62/897,931, filed on Sep. 9, 2019.

GOVERNMENT RIGHTS

This invention was made with government support under DE-SC0018597 awarded by the Department of Energy. The government has certain rights in the invention.

FIELD OF THE INVENTION

Novel copolymers and ionomers therefrom comprising a first repeat unit that is fluorinated and cyclic within the copolymer backbone and a second repeat unit derived from a trifluorovinyl methylene ether monomer are disclosed.

BACKGROUND

Fuel cells and in particular proton exchange membrane (PEM) fuel cells are anticipated for wide-scale use as electrical power sources for a variety of applications that include automotive, stationary, and portable power generation. PEM fuel cells offer low temperature operation, flexibility of scale, high energy densities and efficiencies, and potentially low overall emissions. The core component of a PEM fuel cell is the membrane electrode assembly (MEA) comprising an anode, a membrane separator "PEM", and a cathode. Within the PEM fuel cell, hydrogen that is introduced at the anode is catalytically dissociated to protons and electrons. The electrons flow through an external electric circuit and provide useful power while the protons flow through the membrane separator. The protons react with oxygen and the electrons from the external circuit at a catalyst site in the cathode to form water "exhaust" and heat. Unlike a battery which needs to be recharged, power generation is continuous as long as hydrogen "fuel" is supplied to the PEM fuel cell.

The fuel cell industry is steadily growing but large-scale PEM fuel cell adoption has been gradual for reasons that are both economic and technical. One challenge has been reduction of the quantity or loading of costly platinum group metal (PGM) catalysts in the electrodes, particularly the cathode. Decreased PEM fuel cell efficiency had resulted at low catalyst loadings due to increased oxygen transport resistance in the cathode structure. The PGM catalysts are supported on an electrically conductive substrate such as carbon. The catalyst and substrate in turn are coated with a thin and semi-continuous layer of a strongly acidic and proton-conductive ionomer. The ionomer layer facilitates proton conduction from the membrane separator to the catalyst, where the oxygen reduction reaction occurs to form water. However, the ionomer layer thickness and coverage has been a compromise in order to balance proton conductivity and oxygen permeance.

NAFION®, from The Chemours Company, LLC (Wilmington, Del.) has been an industry-standard ionomer for electrode applications in PEM fuel cells. It is a perfluorinated sulfonic-acid containing ionomer that is derived from a copolymer of tetrafluoroethylene (TFE) and perfluoro(3,6-dioxa-4-methyloct-7-ene)sulfonyl fluoride (PSEPVE). A similar perfluorinated ionomer, AQUIVION® from Solvay (Houston, Tex.), is derived from a copolymer of TFE with perfluoro(3-oxapent-4-ene)sulfonyl fluoride (PFSVE). The ionomer forms of the copolymers were obtained through hydrolysis and acid exchange of the sulfonyl-fluoride group to a sulfonic-acid group. The sulfonic-acid group is strongly acidic, proton conductive, and the oxygen permeability of NAFION® and related perfluorinated ionomers was higher by almost two orders of magnitude compared to most non-fluorinated ionomers as a result of the high affinity of the fluorine groups for oxygen. However, new fluorinated ionomers with even higher oxygen permeability could conceivably facilitate even better catalyst utilization to potentially achieve industry PGM catalyst target loadings.

Fluoropolymer membranes such as from Teflon® AF 2400, from The Chemours Company, LLC, (Wilmington, Del.), that comprised repeat units from 4,5-difluoro-2,2-bis(trifluoromethyl)-1,3-dioxole (PDD) and TFE were known for their high oxygen permeability due to the high free-volume imparted by the cyclic and bulky structure from the PDD repeat unit. Accordingly, fluorinated ionomers that were copolymers comprising PDD with PFSVE, or PSEPVE, were disclosed by Watakabe et al. in U.S. Pat. No. 7,220,508 B2. The oxygen permeability of the PDD comprising ionomers was reported to be up to 2 orders of magnitude higher than either NAFION® or AQUIVION® under dry conditions as disclosed by Perry et al. in U.S. 2013/0245219 A1 and Takami et al. in U.S. 2013/0253157 A1. The oxygen permeability was shown to directly correlate with the PDD mole fraction and inversely with the equivalent weight, which is a measure of ionic content. Disclosed PDD ionomer yields were less than 40% for equivalent weights between 700 and 1000 grams per mole, similar to AQUIVION® and NAFION® equivalent weights, respectively. The low yields were consistent with the known low polymerization reactivity of PFSVE and PSEPVE. Therefore, new ionomers comprising PDD with more reactive monomers that result in higher yields and higher molecular weight are economically desirable and may help achieve both high conductivity and higher oxygen permeability in PEM fuel cell applications.

SUMMARY OF THE INVENTION

This invention discloses novel copolymers and ionomers therefrom that are useful in proton exchange membrane (PEM) fuel cell applications, particularity as the ionomer in the cathode structure. The novel copolymers and ionomers are fluoropolymers comprising a first repeat unit having a fluorinated and cyclic structure within the backbone and a second repeat unit having the structure shown in (I)

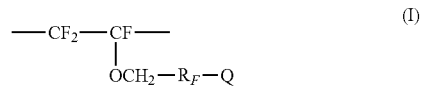

wherein Q is SR, $SO_2R$, SCl, $SO_2Cl$, $SO_3M$, or $SO_3H$; R is an alkyl group containing 1 to 10 carbon atoms and M is an alkali metal ion, an ammonium ion, or $Ag^+$; $R_F$ is a perfluoroalkyl or perfluoroalkoxy group having 1 to 10 carbon atoms, or $CFYCF_2$ wherein Y is Cl or Br.

The second repeat unit is derived from a trifluorovinyl methylene ether monomer. Trifluorovinyl methylene ether monomers include $CF_2=CFOCH_2R_FSR$ and $CF_2=CFOCH_2R_FSO_2R$, which have a methylene ether (OCH₂) group next to the trifluorovinyl (CF₂═CF) group. The methylene ether group is also connected to a perfluoroalkyl or perfluoroalkoxy pendant group ($R_F$) having a terminal thio (SR) or sulfone (SO₂R) functional group. The trifluorovinyl methylene ether monomers are more reactive towards free-radical polymerization because of the methylene ether group relative to monomers that have a perfluoromethylene ether group, such as PSEPVE or PFSVE. The trifluorovinyl methylene ether monomers were shown in the prior art to homo-polymerize and readily copolymerize with other fluoromonomers, such as tetrafluoroethylene (TFE), resulting in linear backbone structures. Copolymer yields above 85% were disclosed.

Herein, trifluorovinyl methylene ether monomers are also reactive in previously undisclosed free-radical copolymerization with fluoromonomers, such as 4,5-difluoro-2,2-bis(trifluoromethyl)-1,3-dioxole (PDD). Copolymerization of PDD and similar fluoromonomers that are cyclic or cyclizable result in a first repeat unit having a fluorinated and cyclic structure in the copolymer backbone. The fluorinated and cyclic repeat unit structure is bulky and imparts a higher free volume and correspondingly higher gas permeability in the resulting copolymers and ionomers therefrom compared to linear backbone structures. Furthermore, the thio (SR) or sulfone (SO₂R) functional group from the second repeat unit can be converted to a sulfonyl chloride (SO₂Cl) or sulfonyl fluoride (SO₂F) group, either through reaction of various intermediates or directly in some cases. The sulfonyl chloride or sulfonyl fluoride groups can in turn be hydrolyzed to a sulfonate group (SO₃M), resulting in the corresponding ionomer form of the novel copolymers. The sulfonate group can be acid exchanged to a sulfonic-acid group for use in PEM fuel cell applications. Additional applications of the copolymers and ionomers therefrom can include use in membranes for separation of gaseous mixtures. This can include separations of alkenes from alkanes, wherein the counter ion (cation) for the sulfonate group in the ionomer is a group 11 metal ion, such as silver ($Ag^+$).

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. In addition, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein. The described embodiments are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. Certain additional terms are also used and some of them are further defined within the following detailed description of the invention.

The preparation of trifluorovinyl methylene ether monomers that form the second repeat unit, such as CF₂═CFOCH₂CF₂CF₂SR or CF₂═CFOCH₂CF₂CF₂SO₂R wherein R is an alkyl group containing 1 to 10 carbon atoms, was previously disclosed by Feiring et al. in U.S. Pat. No. 5,830,962, which is hereby incorporated by reference. Some of the monomers were synthesized from fluoropropionate salts or esters that were disclosed in U.S. Pat. Nos. 4,474,700 and 4,597,913. Herein, the trifluorovinyl methylene ether monomers are copolymerized with fluoromonomers that form a first repeat unit having a fluorinated and cyclic structure in the backbone of the novel copolymers and ionomers therefrom. Examples of fluoromonomers that are cyclic or cyclizable and form a first repeat unit include 4,5-difluoro-2,2-bis(trifluoromethyl)-1,3-dioxole (PDD), 2,2,4-trifluoro-5-trifluoromethoxy-1,3-dioxole (TFMD), perfluoro(alkenyl vinyl ether) such as perfluoro(4-vinyloxyl-1-butene) (PVOB), perfluoro(2-methylene-4-methyl-1,3-dioxolane) (PFMMD), and perfluoro(2-methylene-1,3-dioxolane) (PFM D).

Copolymerization of the monomers can be carried out using known free radical polymerization techniques such as described in U.S. Pat. Nos. 4,273,728, 4,273,729, and 4,275,225, which are hereby incorporated by reference. The composition of the novel fluoropolymers and ionomers can range widely with molar ratios of a first repeat unit to second repeat unit that are between 1:99 and 99:1. Preferably, the molar ratios are between 1:1 and 10:1, more preferably between 1:1 and 5:1. The copolymers may comprise additional repeat units that are different from the first and second repeat units to help improve processability and film formation. The additional repeat units may be formed from comonomers that include tetrafluoroethylene, chlorotrifluoroethylene, vinylidene fluoride, vinyl fluoride, perfluoropropylvinyl ether, and ethylene. The additional repeat units are preferably less than 50 mole % with respect to the average copolymer composition.

Examples of preferred copolymer compositions comprising a first repeat unit that is fluorinated and cyclic and a second repeat unit from a trifluorovinyl methylene ether (TVME) monomer are shown in (II); wherein Q is SR, SO₂R, SCl, SO₂Cl, SO₃M, or SO₃H; R is an alkyl group containing 1 to 10 carbon atoms, M is an alkali metal ion, an ammonium ion, or $Ag^+$; $R_F$ is a perfluoroalkyl or perfluoroalkoxy group having 1 to 10 carbon atoms, or CFYCF₂ wherein Y is Cl or Br; n and m are fractional numbers that define the first to second repeat unit ratio, the average molecular weight of the copolymer repeat unit, and the equivalent weight of the ionomer therefrom.

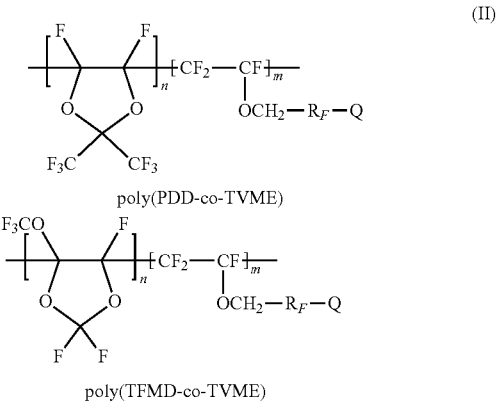

(II)

poly(PDD-co-TVME)

poly(TFMD-co-TVME)

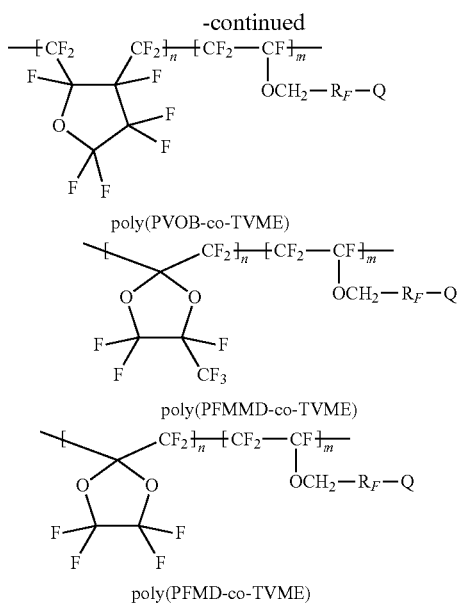

poly(PVOB-co-TVME)

poly(PFMMD-co-TVME)

poly(PFMD-co-TVME)

Copolymerization may be conducted neat, in aqueous emulsion or suspension, or in the presence of an organic liquid, which may or may not be a solvent for any of the starting materials and/or product polymer, and which preferably does not cause appreciable chain transfer. For example, a polymerization may be carried out in 1,1,1,2,3,4,4,5,5,5-decafluoropentane (Vertrel™ XF, Chemours, Wilmington, Del.) using perfluoropropionyl peroxide or preferably the dicarbonyl peroxide of hexafluoropropylene oxide dimer $[(F(CF_2)_3OCF(CF_3)CO_2)_2$, HFPO dimer peroxide] as the free radical initiator. The synthesis of HFPO dimer peroxide was previously disclosed in U.S. Pat. No. 7,112,314 B2, which is hereby incorporated by reference. Polymerization temperature is highly dependent on the chosen initiator and is generally in the range of 0° C. to 80° C., more preferably in the range of 10° C. to 30° C. using HFPO dimer peroxide. Polymerizations are run in the absence of oxygen and generally in a closed pressure vessel to minimize loss of volatile or gaseous components at autogenous pressures.

The thio group (SR) from the second repeat unit in the novel copolymers can be converted to the sulfur chloride (SCl) group through reaction with chlorine and in turn oxidized to a sulfonyl chloride group ($SO_2Cl$) as described by in U.S. Pat. No. 5,830,962. Oxidation to the $SO_2Cl$ group can also be accomplished in one step by reaction of the SR group with chlorine in the presence of water and outlined in reaction sequence (1). Therein, the fluoropolymer is preferably pre-dissolved in an oxidatively stable and inert solvent such as 1,1,1,2,3,4,4,5,5,5-decafluoropentane (Vertrel™ XF). The SR group is reacted under temperature and stoichiometry conditions chosen so that the oxidation occurs selectively with minimal disruption of the carbon-hydrogen bonds in the SR group. Generally, a 3-fold molar amount of chlorine and 2-fold molar amount of water is required for stoichiometric oxidation. However, a molar excess of approximately >3 to 10 and >2 to 20 of chlorine and water, respectively, may be employed and is usually preferred. The oxidation can also be carried out using an alkali metal hypochlorite, such as sodium hypochlorite, in the presence of an acid such as trifluoroacetic acid or hydrochloric acid. Alternatively, an intermediate SCl or a sulfone ($SO_2R$) group may be converted to a sulfonyl fluoride ($SO_2F$) group through reaction with a mixture of fluorine, acetonitrile, and water, or with $BrF_3$ as described in U.S. Pat. No. 5,830,962; provided that when $BrF_3$ is used, R is $CR^2R^3R4$; each of $R^2$, $R^3$, and $R^4$ are independently alkyl containing 1 to 10 carbon atoms.

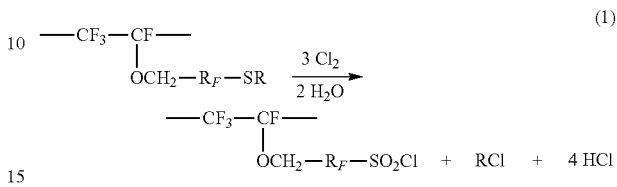

The sulfonyl chloride or sulfonyl fluoride group ($SO_2X$ where X is Cl or F) can be hydrolyzed to a sulfonate group ($SO_3M$) in the corresponding ionomer forms of the novel copolymers, and then acid exchanged to a sulfonic acid group as outlined in reaction sequence (2). For hydrolysis, the sulfonyl chloride group is reacted with 2 equivalents of a base (MOH) in a polar solvent system such as methanol or water. Bases such as sodium hydroxide, potassium hydroxide, ammonium hydroxide, or ammonium carbonate may be employed. Ambient temperatures can be used although temperatures up to 75° C. may be preferred to accelerate the hydrolysis reaction. The sulfonate group can be converted to a sulfonic acid group by an exchange equilibrium reaction with a strong acid (HA) such as nitric acid, hydrochloric acid, or a polymeric ion exchange resin containing a strong acid, such as AMBERLYST® 15, from DDP Specialty Electronics Materials, (Wilmington Del.), when the ionomer is part of a solution. The sulfonic acid form of the ionomer is useful in PEM fuel cell applications that include use as the cathode ionomer. However, the copolymers and particularly the ionomers therefrom as membranes may be used for other separation applications that include separation of gaseous mixtures such as carbon dioxide from nitrogen and separation of alkenes from alkanes. For the latter separation, the counter ion (cation) for the sulfonate group is preferably a group 11 metal ion, such as silver ($Ag^+$). The silver sulfonate group may be obtained through equilibrium exchange of the sulfonic acid form of the ionomer membrane with silver nitrate solution or by heterogeneous reaction of the ionomer in solution with silver carbonate as disclosed by in U.S. Pat. No. 10,639,591.

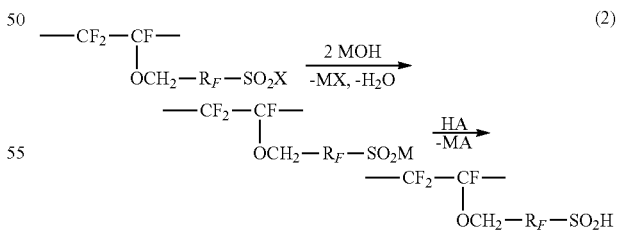

EXAMPLES

Example 1

Copolymerization of $CF_2$=$CFOCH_2CF_2CF_2SC(CH_3)_3$ with PDD: The trifluorovinyl methylene ether monomer, $CF_2$=$CFOCH_2CF_2CF_2SC(CH_3)_3$, is prepared as described in U.S. Pat. No. 5,830,962. A 125-mL stainless-steel pressure vessel incorporating a magnetic drive assembly is evacuated. 36.6-g (0.15 moles) of 4,5-difluoro-2,2-bis(trifluoromethyl)-1,3-dioxole (PDD), 18.0-g (0.06 moles) of the trifluorovinyl methylene ether monomer, 30-mL of 1,1,1,2,3,4,4,5,5,5-decafluoropentane, and 2-mL of 0.15-M HFPO dimer peroxide in 1,1,1,2,3,4,4,5,5,5-decafluoropentane are added in order by syringe through a flexible transfer line connected to the pressure vessel. The resulting mixture is stirred for 18 hours without external heating. The pressure vessel is vented to atmospheric pressure and the contents are diluted to approximately 100-mL with additional 1,1,1,2,3,4,4,5,5,5-decafluoropentane and stirring for 15 minutes. The solution is transferred to a tared evaporation dish and the pressure vessel is rinsed with small portions of 1,1,1,2,3,4,4,5,5,5-decafluoropentane. The rinses are combined in the evaporation dish. The dish is covered with a large watch glass and placed in a vacuum oven that is connected to a cold trap between the oven and vacuum pump. The cold trap is cooled with liquid nitrogen. The oven is carefully evacuated until excessive boiling has subsided as a result of increased viscosity and evaporative cooling. The watch glass is subsequently removed and the vacuum oven is heated to 80° C. The copolymer is dried for several hours to constant weight under vacuum. The copolymer yield is greater than 43.7-g (80%).

Example 2

Oxidation of the —$CF_2SC(CH_3)_3$ group to —$CF_2SO_2Cl$: A 7.5-g sample of the copolymer of example 1 is dissolved in 125-mL of 1,1,1,2,3,4,4,5,5,5-decafluoropentane. The solution is charged to a 500-mL glass-lined pressure vessel and cooled to −30° C. Chlorine gas (11-g) is added followed by a mixture of 60-mL of trifluoroacetic acid and 30-mL of water. The vessel is sealed and the mixture is heated with stirring in an oil bath at 95° C. for 3 days. The mixture is cooled to room temperature, vented to atmospheric pressure and the organic layer is separated. Fluorine NMR analysis shows the disappearance of a peak at −87.7 ppm that is assigned to the —$CF_2SC(CH_3)_3$ group and the appearance of a new peak at −106.7 ppm that is assigned to the —$CF_2SO_2Cl$ group. The organic layer is transferred to a tared evaporation dish, covered with a large watch glass, and placed in a vacuum oven that is connected to a cold trap between the oven and vacuum pump. The trap is cooled by liquid nitrogen. The oven is carefully evacuated until excessive boiling has subsided as a result of increased viscosity and evaporative cooling. The watch glass is subsequently removed and the vacuum oven is heated to 80° C. The oxidized copolymer is dried for several hours to constant weight under vacuum.

Example 3

Hydrolysis of the —$CF_2SO_2Cl$ side chain to —$CF_2SO_3NH_4$ and acid exchange to —$CF_2SO_3H$: A 5.0-g sample of the oxidized copolymer of example 2 is placed in a 100-mL media bottle followed by 2.5-g of ammonium carbonate, 60-mL of methanol, and 10-mL of Novec® HFE-7200. The media bottle is loosely capped and magnetically stirred at ambient room temperature. The copolymer slowly dissolves over 24 hours as hydrolysis progresses to form a colorless and predominantly transparent solution. The solution is carefully evaporated in a Pyrex® dish on a hot plate with mild heating (50-60° C.). The ionomer is isolated as a crude film. The film is divided into smaller pieces that are immersed twice in 2M nitric acid to exchange the ammonium sulfonate groups to sulfonic acid. Excess nitric acid is washed away by soaking with de-ionized water and the film pieces are dried to constant weight in a vacuum oven. An ionomer solution is prepared by dissolving pieces of the dry ionomer (1 part) in isopropanol (19 parts). An acidic ion exchange resin such as AMBERLYST® 15 (1 part) is subsequently added to the solution and roll-milled for 1 hour to acid exchange any residual ammonium and advantageous trace metal cations. The solution is subsequently filtered using 1-μm porosity glass fiber to remove the AMBERLYST® resin.

Example 4

Ionomer equivalent weight (EW) measurement: The ionomer EW is measured by titration and gravimetric solids measurement of the ionomer solution in example 3. Solution samples of approximately 2 to 3 grams are analytically weighed ($W_s$) into 3 separate pre-weighed and tared aluminum boats boat, ($W_{boat}$). The samples are carefully dried on a well-ventilated hotplate (110° C.). The dry samples are cooled to ambient temperature in a desiccator and the dry weight ($W_{dry}$) is subsequently measured. The average solids concentration ($\overline{S}$) is calculated using equation (3):

$$\overline{S}(\%) = \sum \left( \frac{W_{dry} - W_{boat}}{W_S} \right) \Big/ 3 \times 100\% \qquad (3)$$

For the titration, 5 to 6 gram solution samples are analytically weighted ($W_T$) into 3 separate 50-mL Erlenmeyer flasks and diluted to 20-mL with additional isopropanol. The solutions are titrated with 0.0200-M aqueous sodium hydroxide [NaOH] to a phenolphthalein end-point. The initial ($V_I$) and final ($V_F$) sodium hydroxide volumes and a phenolphthalein blank volume ($V_B$) are recorded and the average equivalent weight ($\overline{EW}$) for the free acid is calculated using equation (4). The ionomer equivalent weight is less than 1000 grams per mole.

$$\overline{EW}(g/\text{equivalent}) = \sum \left( \frac{W_T \times 0.01 \overline{S}}{(V_F - V_I - V_B) \times [\text{NaOH}]} \right) \Big/ 3 - 60 \qquad (4)$$

Example 5

Ionomer composite membrane fabrication: Thin-film composite membranes for oxygen permeability measurements are prepared from the ionomer solution of example 3 and a control from NAFION® D2020 solution. Quantitative dilutions with isopropanol to 2.5% for the ionomer and control are prepared in advance for casting. A measured solution weight ($D_W$) of concentration (c) is ring cast over a fixed area (38.3-cm²) onto a polyvinyldine fluoride (PVDF) porous-layer support, which is reinforced on a non-woven polyester backing. The porous-layer support also comprises a very thin Teflon™ AF 2400 gutter layer to facilitate formation of a laminar ionomer layer. The permeance of the combined porous-layer support and gutter layer is at least 2 orders of magnitude greater than the ionomer layer. The ionomer layer is dried at ambient temperature for several hours. Ionomer densities (p) are gravimetrically measured from a sample of the solid ionomer with vacuum assisted displacement of dodecane in a 1 or 2-mL volumetric flask.

A published density of 1.97-g/mL is used for the NAFION® control. The ionomer and control layer thicknesses are calculated from equation (5) and they are between 1 and 2-μm:

$$\text{Thickness } (\mu m) = \frac{100 \times D_W(g) \times c(\%)}{\rho(g\ mL^{-1}) \times 38.3(cm^2)} \quad (5)$$

Example 6

Oxygen permeability measurement: Oxygen permeability is measured using a constant pressure/variable volume technique and apparatus. 47-mm diameter (13.85-cm²) punches from the ionomer and control composite membranes of example 5 are separately tested in a stainless-steel cross-flow cell. A pressure-regulated oxygen (10-psig) flow is humidified by passing it through a NAFION® shell and tube humidifier (MH-70-12, Perma Pure, Toms River N.J.) before entering the stainless-steel cross-flow test cell. Both the humidifier and cross-flow cell are contained within a temperature controlled water bath and the relative humidity (RH) in the test cell is at least 95% at all testing temperatures. The retentate flow at approximately 250-mL/min @ STP is passed through an ice-cold knock-out condenser prior to entering a rotameter having an integral flow control valve. The oxygen permeate is collected under steady-state conditions in an inverted, water-filled, graduated column and the time recorded. The collected gas volume is corrected for the final water-column height, water-vapor pressure, and temperature to STP conditions and the permeability is calculated using equation (6). The permeability of the ionomer at 95% relative humidity conditions is at least 2 times greater than the NAFION® control at all measurement temperatures between 20 and 60° C.

$$\text{Permeability(Barrer)} = \frac{\text{Volume} \times \text{Thickness}}{\text{Area} \times \text{Time} \times \Delta \text{Pressure}} = 10^{-10} \times \frac{cm^3(STP) \times cm}{cm^2 \times \sec \times cm\ Hg} \quad (6)$$

What is claimed is:

1. A copolymer comprising:
   a) a first repeat unit that is fluorinated and cyclic; and
   b) a second repeat unit having the structure:

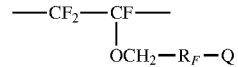

wherein Q is selected from the group consisting of SR, $SO_2R$, SCl, $SO_2Cl$, $SO_3M$, and $SO_3H$; R is an alkyl group containing 1 to 10 carbon atoms and M is selected from the group consisting of an alkali metal ion, an ammonium ion, and $Ag^+$; $R_F$ is a perfluoroalkyl or perfluoroalkoxy group having 1 to 10 carbon atoms, or $CFYCF_2$ wherein Y is Cl or Br.

2. The copolymer of claim 1, further comprising an additional repeat unit selected from a copolymerized derivative of a comonomer selected from a group consisting of tetrafluoroethylene, chlorotrifluoroethylene, vinylidene fluoride, vinyl fluoride, perfluoropropylvinyl ether, and ethylene.

3. The copolymer of claim 1, wherein the first repeat unit is a copolymerized derivative of a fluoromonomer selected from a group consisting of 4,5-difluoro-2,2-bis(trifluoromethyl)-1,3-dioxole, 2,2,4-trifluoro-5-trifluoromethoxy-1,3-dioxole, perfluoro(4-vinyloxyl-1-butene), perfluoro(2-methylene-4-methyl-1,3-dioxolane) and perfluoro(2-methylene-1,3-dioxolane).

4. The copolymer of claim 3, wherein the second repeat unit is a copolymerized derivative of a trifluorovinyl methylene ether monomer selected from a group consisting of $CF_2\!=\!CFOCH_2CF_2CF_2SCH_3$, $CF_2\!=\!CFOCH_2CF_2CF_2SC(CH_3)_3$, and $CF_2\!=\!CFOCH_2CF_2CF_2SO_2C(CH_3)_3$.

5. The copolymer of claim 4, wherein a molar ratio of the first repeat unit to the second repeat unit is between 1:1 and 5:1.

6. A membrane electrode assembly comprising the copolymer of claim 5.

7. A gas separation membrane comprising the copolymer of claim 5.

* * * * *